United States Patent [19]

Bosma

[11] Patent Number: 5,503,082

[45] Date of Patent: Apr. 2, 1996

[54] LOAD-BEARING RAIL AND FLOOR SYSTEM HAVING SLOTTED RAILS EMBEDDED IN CONCRETE FOR THE RECEPTION OF MACHINE MOUNTS OR RAILCAR WHEELS

[75] Inventor: Marinus B. Bosma, Tipp City, Ohio

[73] Assignee: Bosma Machine & Tool Corporation, Tipp City, Ohio

[21] Appl. No.: 296,904

[22] Filed: Aug. 29, 1994

[51] Int. Cl.⁶ ................................................. B61B 1/00
[52] U.S. Cl. ........................... 104/29; 104/139; 104/307; 238/7; 238/9; 248/637; 248/649; 248/673
[58] Field of Search ................................. 104/27, 29, 139, 104/307; 238/2, 3, 4, 7, 9, 129; 384/7, 26, 36, 37, 40; 248/637, 646, 649, 650, 673

[56] References Cited

U.S. PATENT DOCUMENTS

| | | | |
|---|---|---|---|
| 2,739,773 | 3/1956 | Rougemont | 248/650 |
| 4,784,064 | 11/1988 | Nemirovsky et al. | 104/139 |

FOREIGN PATENT DOCUMENTS

| | | | |
|---|---|---|---|
| 549094 | 6/1993 | European Pat. Off. | 248/637 |
| 1341789 | 9/1963 | France | 248/646 |
| 1402891 | 11/1968 | Germany | 384/40 |
| 2513552 | 10/1975 | Germany | 104/139 |

Primary Examiner—Robert J. Oberleitner
Assistant Examiner—S. Joseph Morano
Attorney, Agent, or Firm—William Weigl

[57] ABSTRACT

A concrete-embedded, machinery-anchoring floor system includes parallel, accurately-extruded steel rails each having a unique cross-sectional configuration. Vertical loading of the rails improves the load-bearing strength of the concrete, whether the loading is in tension or compression. Each rail includes a pair of spaced angularly-extending, outwardly and downwardly-projecting flanges. When a downward compressive load is applied through the rails from above, the load also applies downward and inward force vectors generally perpendicular to the angular flanges, compressing concrete therebetween. If tension is applied to a rail from a cantilevered load, the angular flanges are fulcrumed toward each other about their connecting joints with the rail, also compressing and strengthening concrete therebetween. The angular flanges are rounded at their distal edges to enable supporting and interconnecting reinforcing bars to be easily welded to the rounded edges, irrespective of the angle of the bars to the edges. Precision of the supporting surface of the rail system is maintained by providing a unitary floor construction through use of interconnecting welded reinforcing bars and a wire mesh supported on the bars above the bottom of the concrete slab. The rail system may be located in a permanent factory floor or in a precast floor which is transportable with the machinery it supports.

19 Claims, 2 Drawing Sheets

LOAD-BEARING RAIL AND FLOOR SYSTEM HAVING SLOTTED RAILS EMBEDDED IN CONCRETE FOR THE RECEPTION OF MACHINE MOUNTS OR RAILCAR WHEELS

This invention relates to a slotted load-bearing rail system for precision supporting and anchoring of machinery and fabricating equipment on a concrete floor, and to a novel cross-sectional rail configuration in which either tensile or compressive forces applied to a rail induce strengthening compressive stresses in concrete below and immediately surrounding the rail.

BACKGROUND OF THE INVENTION

It is well known that concrete is strong in compression, but has relatively low tensile strength. Concrete members which are subjected to tensile stress where it must be avoided or minimized are ordinarily reinforced with steel bars and/or high-strength steel wire fabric or mesh. In this manner, the steel, which is strong in tension, makes up for the deficiency of tensile strength in concrete. Except for the addition of bars and mesh, tensile strength has frequently been ignored in concrete design calculations because its effect is small in comparison to its compressive strength. In a concrete floor, for example, design focus to improve tensile resistance has been directed solely to provision of embedding longitudinal reinforcing steel bars and/or mesh in the tensile side of the slab. The bonding strength between the typical roughened surface of the steel and the concrete compensates for the lack of other means to increase tensile strength of the slab.

In machinery-supporting floors, T-slotted anchor rails which are fabricated by longitudinal welding of separate channels, I-beams, etc. are typically embedded with their slotted anchoring surfaces generally flush with the concrete floor. Machines are then fastened to the floor with bolts which have their nuts in the cross slots of inverted T-slots and the bolt shanks extend upwardly through the vertical slot formed by the T. Because of the rails being fabricated from multiple elongated members, it is difficult to keep them straight, level and accurate over long distances, e.g., in excess of fifty feet or so. Reduced accuracy of the rail anchoring surfaces requires extra time and effort in positioning the equipment. Such rails typically are capable of compressing the concrete directly beneath them under a downwardly-directed load, but offer no resistance through the concrete if an upwardly-directed tensile load is applied to the rails, e.g., if the machine must necessarily be cantilever-mounted. Oftentimes, the potential for tensile loading is compensated for by outboard supporting of the cantilevered portion of the machine directly from the concrete so as to reduce the effects of tension on the rails and surrounding concrete.

SUMMARY OF THE INVENTION

A precision-surface floor rail system which is embedded in concrete includes a unique cross-sectional configuration of extruded steel rail. Vertical loading of the rails strengthens the concrete whether the load applied is in tension or compression. Each rail includes opposed angularly-extending flanges which compress concrete therebetween under both tensile and compressive loading conditions. These flanges are rounded at their distal edges to enable supporting reinforcing bars to be welded thereto without concern about the angle at which the bars are positioned. The precision of the rails is maintained in the total floor construction by reinforcing bars and wire mesh.

A principal object of the invention is to provide a precision-surface rail system in a concrete floor, and in particular, to a unique configuration of rail used in such system.

Another object is to provide a concrete-embedded floor rail system which increases the strength of the supporting concrete whether an induced load applied to the rails is in compression or tension.

A further object is to provide a unique configuration of the cross-section of a rail utilized in such a system to induce compression of the concrete surrounding the rail whether the load applied to the rail is tensile or compressive.

A further object is to provide an accurately-extruded elongated rail for such a system, providing for greater accuracy of the rails in preparing the floor as well as in utilizing it afterward to position and support machinery.

A still further object is to enable the extruded rail to be used in any length, including unconnected individual anchors, each of which acts to compress surrounding concrete whether under compressive or tensile loading.

A further object is to so shape the side edges of embedded flanges of such rails to simplify welding of reinforcing bars to the rails prior to pouring of concrete.

Still another object is to provide a floor rail system in which the tensile strength of the floor enables a reduction in floor thickness while maintaining its load supporting capabilities.

Another object is to provide a floor rail system which is compatible with conventional railroad tracks to enable a specially-designed railroad-like car to transport materials to and from the building containing such floor rail system via conventional railroad tracks.

Other objects will become apparent from the following description, in which reference is made to the accompanying drawings.

DESCRIPTION OF THE PREFERRED EMBODIMENT

Figure 1:
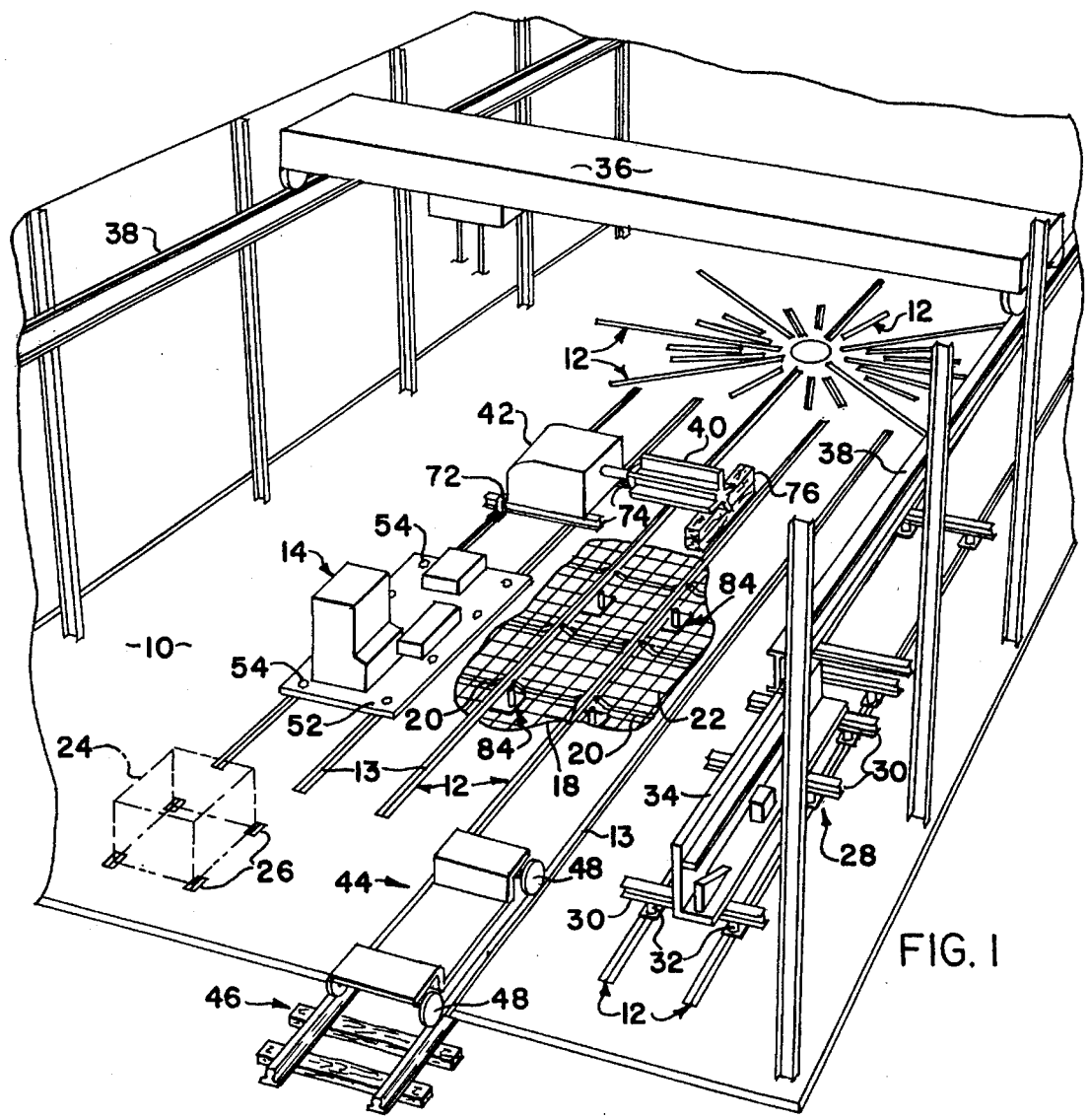
FIG. 1 is a simplified isometric view of a typical factory floor for machining and fabricating metal, partly fragmentary to show a portion of the floor construction of this invention.

FIG. 1 depicts a factory setting in which both machining and welding fabrication operations can be conducted. A concrete floor 10 has a plurality of slotted rails 12 laid generally flush with (but preferably a fraction of an inch below) the finished surface of the concrete. Where the concrete surface is to be machine-finished after the plastic material has been poured, slots 13 in the rails are completely filled with an elongated strip and the floor level is spaced slightly above the tops of the rails 12 to avoid metal-against-metal contact between the finishing blades and the rails. For the most part, the rails 12 are arranged in parallel fashion, but can also be positioned uniquely depending on the particular kind of machine or fabrication set-up desired. At the far end of the floor 10, a radial arrangement of rails is shown as one example of a non-parallel rail set-up.

Figure 2:
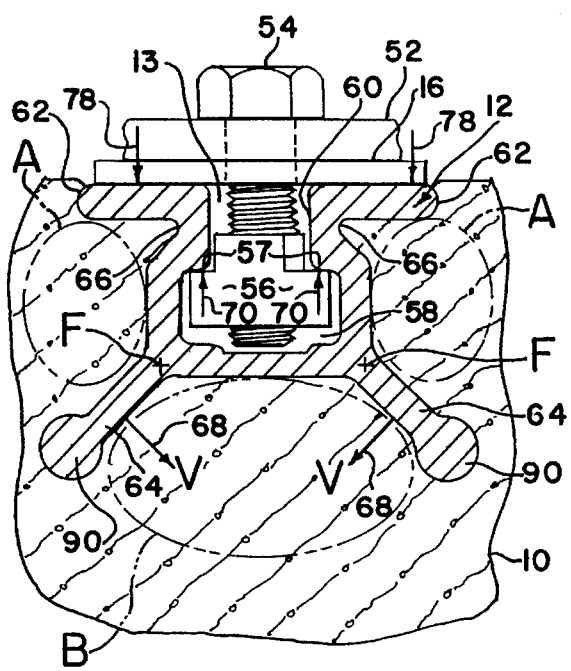
FIG. 2 is an elevational cross-sectional view of the preferred form of rail utilized in the floor rail system of FIG. 1, but without reinforcing steel being shown.

A machine 14 is anchored to straddle one pair of rails, being positioned atop shim plate 16 (FIG. 2) because of the desired slight recessing of the tops of the rails 12 below the concrete surface. FIG. 2 shows that the machine or anything else supported by the rails is thus actually above the floor surface, to maintain the accuracy built into the rails themselves. The rails are extruded steel maintained to an accuracy of 0.020 inches over a length of fifteen feet. Rails are preferably produced of that length for ease of shipment. When multiple rails 12 are butt-welded into a length of over one hundred feet, the accuracy can be maintained by conventional techniques within plus or minus 0.0625 inches from end to end. Such surface accuracy not only allows for ease and time saving in original installation of a machine, but also enables easy changes to be made in machine locations as conditions may require repositioning.

A section of concrete has been left open in the floor 10 of FIG. 1 at 18 to illustrate how an integral structure of rails 12, reinforcing truss bars 20 and wire mesh 22 are interconnected so that the entire steel structure is essentially tied together from side-to-side and end-to-end of the building. As will be seen, the bars and rails are welded wherever they come in contact, and the wire mesh is trapped beneath the rails but rests on top of the truss bars 20. If desired, occasional welding of mesh to bars 20 can also be done for added strength. It has been observed that once the steel structure has been assembled and is ready for pouring of concrete, individuals can walk on the structure freely without concern of any shifting of its components.

While the rails 12 of this invention are capable of compressing and therefore strengthening concrete surrounding any area where loaded, the additional bonding of the steel structure provides for a floor that removes any potential tensile force from adversely affecting the floor. In fact, computer modeling shows that an eight inch thick floor constructed in this manner with the particular rails disclosed is as strong as a ten inch thick floor made by standard techniques. The rails may be independent of any steel support in some instances, being cut to short independent lengths, e.g., six inches or so. Many individual anchoring devices can support smaller machines at four corners, without any steel reinforcement. This is shown in dotted lines at the lower left of FIG. 1, where a machine 24 is supported on four short rails 26 which are aligned longitudinally, but are independent and spaced apart. As will be seen later from a description of how the rails 12 compress and thereby strengthen surrounding concrete under both tensile and compressive loading, it will become apparent that even a short length of rail such as 26 has certain advantages over conventional independent machine-anchoring devices.

A welding fabrication table 28 consists of parallel I-beams 30 mounted on short pillars 32, which are anchored to the rails 12. The beams 30 are spaced apart as desired to enable a welder to move about the floor 10 between the beams 30 while performing necessary welding tasks on any particular structure 34 being assembled. This nicely places workpieces at a convenient working level and also establishes a fairly accurate material-working surface provided by the topsides of the beams 30.

Figure 6:
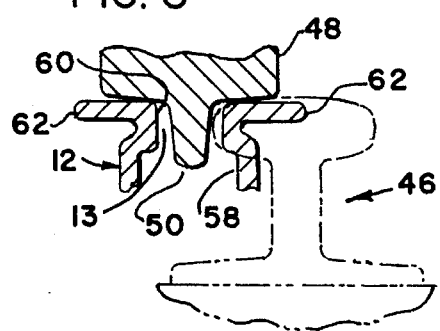
FIG. 6 is an elevational view illustrating the alignment of a flanged wheel of a material transporting vehicle of FIG. 1 with conventional railroad tracks.

Work is lifted, moved about the shop and lowered from one work location to the next by a conventional overhead crane supported on horizontal tracks 38 spanning the floor 10. The tracks 38 are supported on vertical I-beams 39. For example, a workpiece 40 produced on a cantilever-mounted indexing machine 42 (FIGS. 1 and 5) may have metal plates welded about a central post at machine 42, lifted therefrom by the crane 36 upon completion and then moved to machine 14 for machining. After completion of machining, it may be lifted again and be moved to a car 44, and from there, either to another shop or a railroad siding for shipment by rail to an end destination. The car 44 is used for material transportation to and from the shop, coming in as raw plate material and going out as completed or at least partially-completed product. Standard gauge railroad tracks 46 are butt-ended to a pair of rails 12 which are specifically intended as tracks for the car 44 when inside the shop. They are aligned as shown in FIG. 6 so that wheels 48 can transfer between the rails 12 and railroad tracks 46 with ease. The wheels 48 have a center flange 50 which fits the slots in the rails. One side of the flange 50 mates with the inside edge of a railroad track so the car 44 can freely move between tracks 46 and rails 12.

The key element of the floor structure is the cross-sectional configuration of the rails 12. This is best illustrated in FIG. 2, where a rail is embedded in concrete and has a machine flange 52 bolted to the rail 12 by means of a bolt 54 and nut 56. (No steel structure has been illustrated in FIG. 2, so that the effect of even a short rail, e.g. rail 26, can be seen. The nut and bolt are common off-the-shelf items, the nut having a parallelogram shape to enable its narrow sides to slip into and out of the slot 13 form above. By tightening the bolt head, its wider sides turn to the position shown in FIG. 2 where it can engage the underside portion 57 of the rail within a horizontal cross slot 58 to lock the bolt in place. The cross slot 58 is part of an inverted T-slot, the vertical portion 60 of the T opening at its upper end to form the slot 13 through which the bolts 54 fit. In its preferred form, the walls of the rail 12 surrounding the T, as well as horizontal flanges 62 and diagonal flanges 64 extending outwardly from the T are of relatively uniform thickness. To maintain this thickness, undercuts or recesses 66 are formed in the extrusion generally above the cross slot 58 where the flanges 62 join the side walls. In addition, a horizontal portion of the wall at the bottom of the cross slot 58 is relieved to allow for the bolt 54 to protrude below the nuts 56 into the relief if necessary. The relief also allows added central deformability of the rail 12 to enable loading to cause a force vector V to be directed inwardly in the direction of arrows 68. Force vector V results in compression of concrete between the flanges 64 with the customary concrete strengthening effect resulting from such compression.

Figure 5:
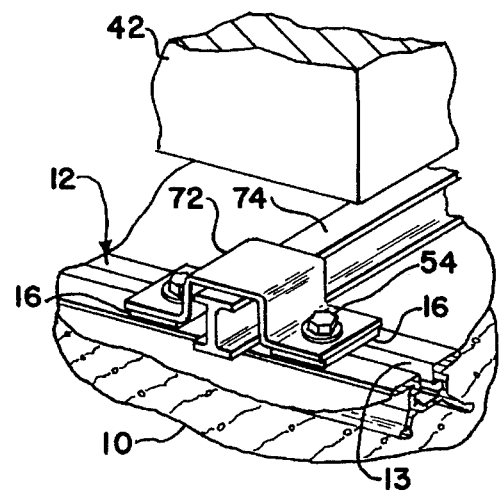
FIG. 5 illustrates one method of mounting an I-beam supported machine such as the cantilevered machine shown at the upper left in FIG. 1.

Two different kinds of loading can be imposed on the rail 12, tensile and compressive. (Shear loads are only of very nominal concern, but will also be compensated for to some degree with the rail configuration illustrated.) A tensile loading is shown by arrows 70 wherein an upwardly-directed vertical force is transmitted through the nut 56 in response to a cantilevered load. This load can be the result of mounting a machine such as 42 as shown in FIG. 5. There, a strap 72 holds an I-beam 74 down against the surface of the rail 12, with shim plates 16 inserted between the strap and the surface. The I-beam 74 is one of two which are fastened to the underside side edges of the indexing machine 42 (FIG. 1). Ordinarily, workpiece 40 is supported by blocks 76 as welding proceeds on the workpiece. However, when indexing of the workpiece about a horizontal axis to another position becomes necessary, at least the upper one of the blocks 76 is temporarily removed and then restored. The overhead crane 36 would be used to support the end of the workpiece during block removal. During this time, the possibility exists for either compression or tension to be applied to the rail 12 through the I-beam 74. The force applied depends on the actions of lifting the workpiece, indexing it to a different position and then lowering the workpiece to again be supported on the blocks 76. If the load is in tension, the nuts 56 will tend to raise the rail in the direction of arrows 70. The result, however, is to cause a force to want to spread the rail 12 outwardly of the T-slot and move the opposite sides about fulcrums F. In so doing, the flanges 64 tend to load concrete in area A. At the same time, pivotal deflection about fulcrums F will tend to move horizontal flanges 62 downwardly, compressing concrete in areas B.

If the loading of rail 12 is in compression, the same general effect is achieved. But this time, the primary force is applied downwardly in the direction af arrows 78. This causes a bending moment about fulcrums F at the same time the main vertical load is applied to the horizontal flanges 62, It can be assumed that areas B will be compressed to a larger degree than area A in response to loading at 78, and that greater compression occurs in area A than in areas B in response to tensile loading at 70. The same rail 12 can be loaded in compression at one point and in tension at another point along its length, with the same strengthening effect of the concrete immediately surrounding the area loaded. This is demonstrated by the compressive loading by the machine 14 of FIG. 1, and the likely possibility of tensile (or possibly an alternating combination of both during indexing) loading at machine 42, all to the same rail 12. Regardless of which type of loading is present, computer modeling illustrates that the net effect is to compress concrete surrounding the rail 12 in either instance. This is even true for a short independent rail such as 26, as well as rails that are provided with the steel structure illustrated at 18 in FIG. 1.

CONSTRUCTING A FLOOR

Figure 7:
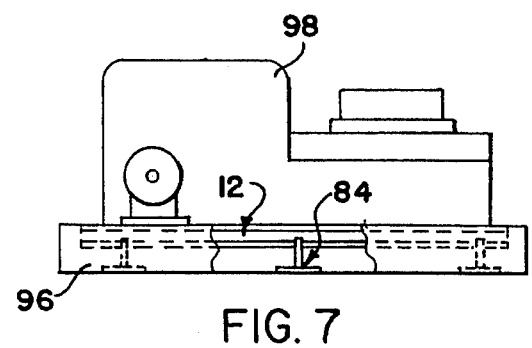
FIG. 7 is a simplified elevational view of a portable Floor system of this invention supporting a machine with which it is capable of being shipped as an integral unit.
Figure 3:
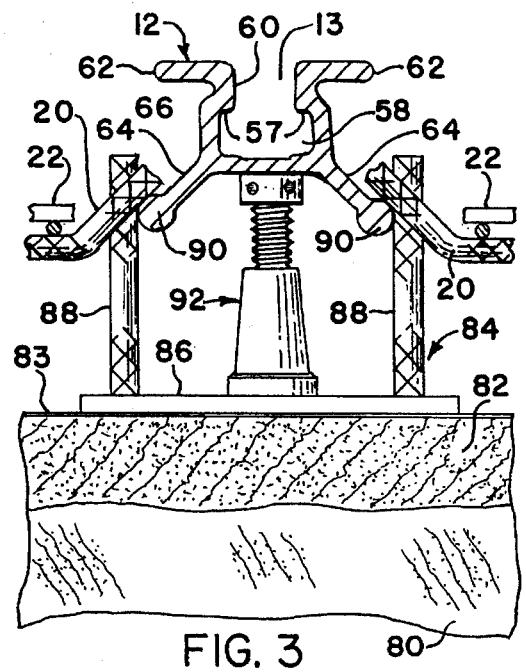
FIG. 3 is a vertical section of one type of rail-supporting structure illustrating how the rail top surfaces can be established in a common plane prior to pouring of concrete.
Figure 4:
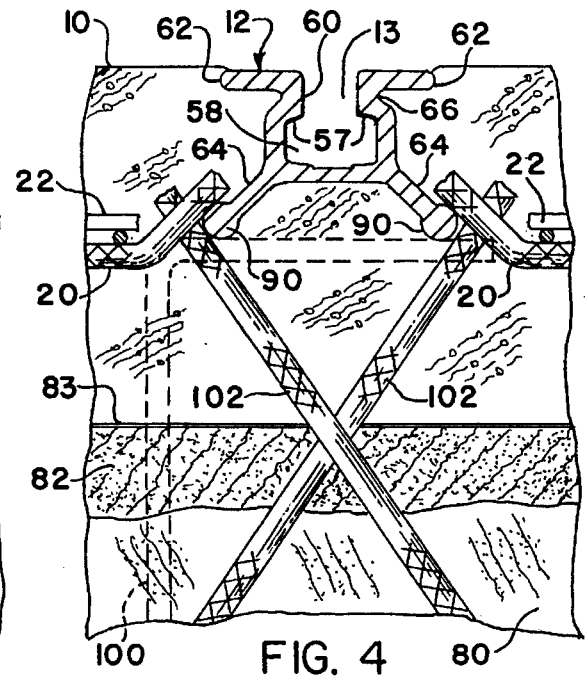
FIG. 4 is a view similar to FIG. 3, but with a different type of rail-supporting structure for permanently locating the floor system in a factory setting.

FIGS. 3 and 4 show two different methods of preparing a floor, FIG. 3 depicting a version which enables the floor to be permanent as in FIG. 1 or portable as will be described in connection with FIG. 7. The version of FIG. 4 is designed for a permanent factory floor, where the floor 10 is supported on ground or earth 80. The two versions can differ in their methods of leveling if made to be permanent. FIG. 3 illustrates a technique in which the top surfaces of the rails 12 are placed slightly below their final levels and are jacked upwardly to achieve proper height. In FIG. 4, the initial levels are kept slightly above their final levels, and the rails are tapped down to achieve the correct upper level. In either method, conventional laser-leveling techniques are preferred to be employed because of the high degree of accuracy attainable.

In FIG. 3, after the earth or ground level is dug out to a depth of about eight inches, two inches of sand 82 is placed atop the ground 80 and tamped down. A plastic moisture barrier sheet 83 is placed across the sand as is common in concrete construction. A welded wire fabric or mesh 85 of the type used in road construction is then placed atop the barrier sheet 83. For example, the mesh may be of No. 6 wire and have squares of six inches by six inches. The location of the first rail, for example, a fifteen foot length of a rail which is to eventually be one-hundred feet in length in the final floor 10, is determined. At positions about four feet apart, cutouts are made in the wire mesh to receive a plurality of rail supports 84 placed on tightly-tamped sand below the sheet 83. The levels of the tightly-tamped areas are determined by the laser leveling means (not shown). Each support 84 consists of a plate 86 and a pair of short upright reinforcing bars 88 which are welded to the plate 86. The facing edges of the bars are spaced apart the distance between the outermost edges of ball-shaped edges 90 at the distal edges or ends of the flanges 64. (Edges 90 are hereinafter called balls, although they extend the full length of the rails and are only ball-shaped in cross section). A standard machine shop jack 92 is shown in dotted lines in FIG. 3 as having its lower end supported on plate 86 and it upper jackable screw end contacting a horizontal portion of the underside of the rail 12 between the flanges 64. Using the laser-leveler for sighting, the screws of the jacks 92 are manipulated until the top of the first rail has been raised to the precise level required in the end floor. Naturally, at this time the first rail will also be properly spaced between the side walls of the factory. When in precise position, the points of contact of the bars 88 with the balls 90 are welded together, providing firm support of the first rail 12 on the tamped sand. The jacks 92 can then be removed for reuse to level another rail. This can be followed by doing a second rail parallel to the first in the same manner, or by continuing with another rail in line with the first and butt-welding their ends to make one long rail 12. Placing the second rail parallel to the first allows tying the first and second rails together promptly after the second has been leveled. If desired, jacks 92 may be left in place until several adjoining rails have been interconnected.

Either after a pair of parallel rails are positioned or after all rails are located in their final spots, the mesh 85 is brought up to the undersides of the rails and the reinforcing truss bars 20 are threaded through the mesh and their angled ends rested atop the balls 90 between adjacent rails. Each bar 20 is like a long U, with angled legs of the U being short to nestle the mesh 85 to the underside of the rails. It will be seen that the truss bars 20 support the wire mesh 85 between the rails, but the mesh directly beneath the rails hangs free. The truss bars 20 are welded to the balls 90 after the bars are positioned in their desired locations. Spacing can be as shown at 18 in the center of FIG. 1. If desired, weld tacks can also be applied at certain points where the mesh and truss bars contact.

The identical technique of FIG. 3 can be used in making a precast portable floor 96 (FIG. 7) which is transportable with a machine 98 supported thereby. One exception in production of such floor is that if would rest on a flat base surface and be surrounded by a concrete form, rather than be made in a hole on a possibly uneven ground surface. Such portable floors are used in the oil-drilling industry, where precision machinery is floor-mounted in a factory setting and then moved to an oil rig with the machine and floor intact.

FIG. 4 illustrates a variation of the technique used to prepare a factory floor. In this instance, since the floor is to be permanent, a series of spaced L or T bars 100 are driven into the ground 80 lengthwise of the position of a first rail 12. Their upper levels are located to have a rail placed thereon slightly above its final level. Cross supporting reinforcing bars 102 are then driven angularly into the ground as shown. The angles at which they are placed are not significant, but the bars 102 should be located up against the balls 90, to which they will ultimately be welded. After the bars 102 have been positioned For a first rail, the rail is tapped down with a sledge to drive the bars 100 down until the top of the rail is in its precise location, and the bars 102 are welded to the balls 90. When this is repeated for a second bar, the mesh is cut out where bars 102 pass therethrough to enable the mesh to be lifted to the bottoms of the rails, the truss bars 94 are made to support the mesh and weld tacks are applied as was done in the FIG. 3 example.

Various changes may be made without departing from the spirit and scope of the claims.

Having described my invention, I claim:

1. An elongated extruded steel anchor rail for embeddment in a concrete floor, said rail having an upper planar horizontal load-bearing surface, the cross-sectional shape of said rail including an inverted T-slot with an upwardly-open vertical leg forming a slot in said load-bearing surface, said slot having a vertical width dimension for receiving a vertical bolt therethrough and a horizontal cross slot normal to said vertical leg and having a depth dimension for receiving a nut threaded onto said bolt, said nut and bolt enabling secure anchoring of a load to said load-bearing surface from above said floor, the improvement comprising said cross-sectional shape of said rail and further including:

essentially uniform thickness walls surrounding and defining said T-slot;

first and second flanges extending laterally and horizontally outwardly from said slot and forming said load-bearing surface;

third and fourth flanges extending angularly outwardly and downwardly from a joint at each lower distal end of said cross slot;

said walls and all of said flanges being generally of the same cross-sectional thickness throughout the length of the rail; and each of said joints providing a fulcrum about which said third and fourth flanges are capable of sufficient deflection to induce an inwardly-directed force vector to both said third and fourth flanges toward each other to place cured concrete therebetween under compression in response to a load applied to said rail.

2. An anchor rail according to claim 1 wherein said rail is elongated at least six inches.

3. An anchor rail according to claim 1 wherein said load is an upwardly-directed tensile force applied by said nut.

4. An anchor rail according to claim 1 wherein said load is a downwardly-directed compressive force applied to the planar load-bearing surface of said rail.

5. An anchor rail according to claim 4 wherein the inwardly-directed force vector applied to said third and fourth flanges is partially transmitted therethrough by concrete between said horizontal and angular flanges.

6. An anchor rail according to claim 1 wherein said third and fourth flanges extend essentially at a forty-five degree angle downwardly and outwardly from their respective joints.

7. An anchor rail according to claim 1 wherein the distal end of each said third and fourth flanges is ball-shaped in cross-section, each said ball having a radius approximating the wall thickness of said rail and said balls extending the length of said rail.

8. An anchor rail according to claim 1 wherein said rail is recessed throughout its length between each of said first and second flanges and the adjacent ends of said cross slot, whereby to maintain the same general cross-sectional thickness of said rail throughout.

9. An anchor rail according to claim 1 wherein both tensile and compressive loading may be applied to said rail at different areas along its length, both said tensile and compressive loading resulting solely in compression of concrete immediately surrounding said rail at the areas of load application.

10. An elongated steel anchor rail for embeddment in a concrete floor, said rail having an upper planar horizontal load-bearing surface, the cross-sectional shape of said rail including an inverted T-slot with an upwardly-open vertical leg forming a slot in said load-bearing surface, said slot having a vertical width dimension for receiving a vertical bolt therethrough and a horizontal cross slot normal to said vertical leg and having a depth dimension for receiving a nut threaded onto said bolt, said nut and bolt enabling secure anchoring of a load to said load-bearing surface from above said floor, the improvement comprising said cross-sectional shape of said rail and further including:

a wall surrounding and defining said T-slot except at the upwardly-open slot;

first and second flanges each extending laterally and horizontally outwardly from the wall adjoining opposing sides of said slot, said first and second flanges forming said load-bearing surface;

third and fourth flanges each extending angularly outwardly and downwardly from a joint in the wall at opposing lower distal ends of said cross slot; and each of said joints providing a fulcrum about which said third and fourth flanges are capable of flexing sufficiently to induce an inwardly-directed force vector to both said third and fourth flanges toward each other to place cured concrete therebetween under compression in response to a load applied to said rail.

11. An anchor rail according to claim 10 wherein said load is an upwardly-directed tensile force applied by said nut.

12. An anchor rail according to claim 10 wherein said load is a downwardly-directed compressive force applied to the planar load-bearing surface of said rail.

13. An anchor rail according to claim 12 wherein the inwardly-directed force vector applied to said third and fourth flanges is partially transmitted therethrough by concrete between said horizontal and angular flanges.

14. An anchor rail according to claim 10 wherein said third and fourth flanges are of like thickness and extend essentially at a forty-five degree angle downwardly and outwardly from their respective joints.

15. An anchor rail according to claim 10 wherein the distal end of each said third and fourth flanges is ball-shaped in cross-section, each said ball having a radius approximating the thickness of said third and fourth flanges, and said balls extending the length of said rail.

16. A floor rail system comprising a plurality of spaced parallel rails interconnected by reinforcing bars into a unitary floor structure, all of said rails having upper load-bearing surfaces lying in a common horizontal plane and said unitary floor structure being embedded throughout in concrete, the improvement consisting of each rail having a cross-sectional shape comprising:

essentially uniform thickness walls surrounding and defining an inverted T-slot having an upwardly-open vertical leg forming a slot in each rail and a horizontal cross slot normal to said vertical leg;

first and second flanges extending laterally and horizontally outwardly from the slot of each rail and forming said load-bearing surfaces;

third and fourth flanges extending angularly outwardly and downwardly from a joint at each lower distal end of said cross slot of each said rail;

said walls and all of said flanges being generally of the same cross-sectional thickness throughout the length of each rail;

each of said joints providing a fulcrum about which said third and fourth flanges are capable of flexing sufficiently to induce an inwardly-directed force vector to both said third and fourth flanges toward each other to place cured concrete therebetween under compression in response to a load applied to said rail; and a plurality of reinforcing bars between and interconnecting each adjacent pair of rails, said rails and reinforcing bars being fastened by welding to form an integral structure prior to pouring of concrete thereabout.

17. A floor rail system according to claim 16 wherein both tensile and compressive forces applied to said rails induce compressive force vectors in said third and fourth flanges to compress concrete between said third and fourth flanges.

18. A floor rail system according to claim 17 wherein a downwardly-directed compressive force applied to the load-bearing surface of a rail is at least partially applied to said third and fourth flanges through concrete beneath said first and second flanges.

19. A floor rail system according to claim 16 wherein at least one pair of parallel rails is spaced apart to align in butt-ended relationship with standard railroad tracks, and wherein a material transporting car is provided with wheels compatible to ride over both the railroad tracks and the rails by means of the slots in said rails, whereby materials may be transported between the area of the floor rail system and a second area remote therefrom.

\* \* \* \* \*